United States Patent [19]
Herronen et al.

[11] Patent Number: 6,019,214
[45] Date of Patent: Feb. 1, 2000

[54] ASYNCHRONOUS CONVEYOR CONSTRUCTION

[75] Inventors: John R. Herronen; Dennis C. Rowe, both of Linden; Daniel C. Barshaw, Fenton, all of Mich.

[73] Assignee: Atlas Technologies, Inc., Fenton, Mich.

[21] Appl. No.: 08/812,934

[22] Filed: Mar. 4, 1997

[51] Int. Cl.[7] .................................................. B65G 17/24
[52] U.S. Cl. ..................................... 198/465.1; 198/343.1
[58] Field of Search ............................. 198/343.1, 345.3, 198/465.1, 867.13

[56] References Cited

U.S. PATENT DOCUMENTS

| | | |
|---|---|---|
| 3,805,942 | 4/1974 | Auernhammer ................. 198/345.3 X |
| 3,934,701 | 1/1976 | Mooney et al. . |
| 3,949,859 | 4/1976 | Nussbaumer et al. . |
| 4,088,220 | 5/1978 | Jacksch et al. . |
| 4,201,286 | 5/1980 | Meier . |
| 4,331,229 | 5/1982 | Kamm ................................. 198/345.3 |
| 4,431,102 | 2/1984 | Bittner ................................ 198/345.3 |
| 4,442,935 | 4/1984 | Gregg . |
| 4,712,670 | 12/1987 | Burkhardt ........................ 198/465.1 X |
| 4,751,998 | 6/1988 | Yano . |
| 4,776,452 | 10/1988 | Burkhardt ........................ 198/465.1 X |
| 4,776,453 | 10/1988 | Miller . |
| 4,934,515 | 6/1990 | Linden . |
| 4,947,978 | 8/1990 | Rhodes ............................ 198/465.1 X |
| 5,735,384 | 4/1998 | Lingo et al. ......................... 198/465.1 |

Primary Examiner—James W. Keenan
Attorney, Agent, or Firm—Reising, Ethington, Barnes, Kisselle, Learman & McCulloch, P.C.

[57] ABSTRACT

An accumulating conveyor assembly has an endless, continuously moving conveyor member defining a closed path having inside and outside edges. A plurality of workpiece supports are coupled to the conveyor member for movement with and relative to the latter. The supports are substantially vertical and are at the outer edge of the path so that a workpiece supported on the support is accessible at any position along the path. Arresters are movable into and out of the path of movement of the supports so as respectively to disable and enable conjoint movement of the supports and the conveyor member.

19 Claims, 4 Drawing Sheets

ASYNCHRONOUS CONVEYOR CONSTRUCTION

This invention relates to an asynchronous or accumulating conveyor of the kind having a continuously moving conveyor member defining an endless path and a plurality of workpiece supports arranged vertically and coupled to the conveyor member in such manner as to enable conjoint movement of the conveyor member and the workpiece supports or relative movement of the conveyor member and one or more of the workpiece supports.

BACKGROUND OF THE INVENTION

Asynchronous or accumulating conveyor systems are well known and conventionally employ a continuously moving conveyor chain, belt, or other member forming an endless path for conveying workpieces successively past work stations or from one work area to another. Conventionally, the workpieces are supported on pallets which underlie fixturing on which a workpiece may be carried so that the pallet and workpiece overlie the conveyor member and project above the latter.

It often is necessary to arrest movement of one or more of the workpiece supports to enable one or more operations to be performed on the workpieces carried by such supports or to effect proper spacing between successive workpieces. However, it is preferred to enable the conveyor member to continue to move, thereby enabling workpieces other than those whose movement has been arrested to continue to travel along the path. This objective usually is obtained by the provision of a non positive driving coupling between each workpiece support and the conveyor member, the coupling being operable to enable conjoint movement of each workpiece support and the conveyor unless and until such time as movement of the workpiece support along the conveyor path is arrested.

Asynchronous conveyor constructions of the kind currently in use include endless conveyor members which travel in a closed path in a substantially horizontal plane. Known asynchronous conveyors also include what is known as over-and-under conveyors wherein an endless conveyor member has vertically spaced upper and lower runs to which are non positively coupled workpiece supports that enable workpieces to be transferred longitudinally along the upper run, the lower run, or both. The non positive coupling means enables the workpiece supports to move conjointly with the conveyor member or be arrested while the conveyor member continues to move.

Although the known prior art asynchronous conveyors function satisfactorily in many instances, the height at which the workpieces are supported often are at a level which is not ergonomically appropriate. Further, the conventional asynchronous conveyors often do not provide as many work stations that may be desirable. In addition, some of such known conveyors lack convenient access for maintenance and repair purposes.

In addition to the foregoing, many of the conventional asynchronous conveyors do not lend themselves to the most efficient utilization of available floor space since the conveyor members associated with such conveyor systems impose limitations on the kinds of turns which the conveyor member may negotiate.

A principal objective of the invention is to provide an asynchronous conveyor construction which overcomes the disadvantages referred to above.

SUMMARY OF THE INVENTION

An asynchronous conveyor constructed in accordance with the preferred embodiment of the invention comprises a frame on which a continuously movable conveyor member is mounted for movement in a substantially horizontal plane along an endless path. Also mounted on the frame are vertically spaced ledges on which a plurality of workpiece supports or pallets may be suspended vertically so as to travel along a path which parallels the path of movement of the conveyor member and is at the outer edge of the path defined by the conveyor member. This arrangement makes it possible for a workpiece to be supported by each workpiece support and be accessible at virtually any point along the path traversed by the workpieces. Consequently, workpieces may be placed on and removed from the workpiece supports at virtually any position along the length of the path traveled by the workpieces.

By arranging the workpiece supports so that they are suspended vertically, it is possible to position workpieces on the supports at a level which is ergonomically appropriate.

Each workpiece support has a non positive drive coupling with the continuously movable conveyor member so as selectively to enable and disable conjoint movement of the workpiece supports and the conveyor member. Arresting means engageable with any workpiece support or workpiece, or both, is movable into and out of the path of movement of the workpiece supports so as to engage and disengage a selected support and halt movement thereof when desired while the conveyor member and other, non-arrested workpiece supports continue their movement.

The drive coupling preferably is mounted on the workpiece support to bear forcibly upon the conveyor member. The force with which the coupling bears upon the conveyor member is variable thereby enabling an optimum asynchronous drive coupling to be achieved between each workpiece support and the conveyor member.

Since the workpiece supports are suspended vertically, the conveyor member may assume any one of a number of different shapes, in plan, thereby enabling the path followed by the workpieces to be adaptable to many different configurations. This arrangement of the workpiece support also makes possible access to the conveyor member and the associated parts for ease of maintenance and repair.

THE DRAWINGS

A presently preferred embodiment of the invention is illustrated in the accompanying drawings wherein.

THE PREFERRED EMBODIMENT

Figure 1:
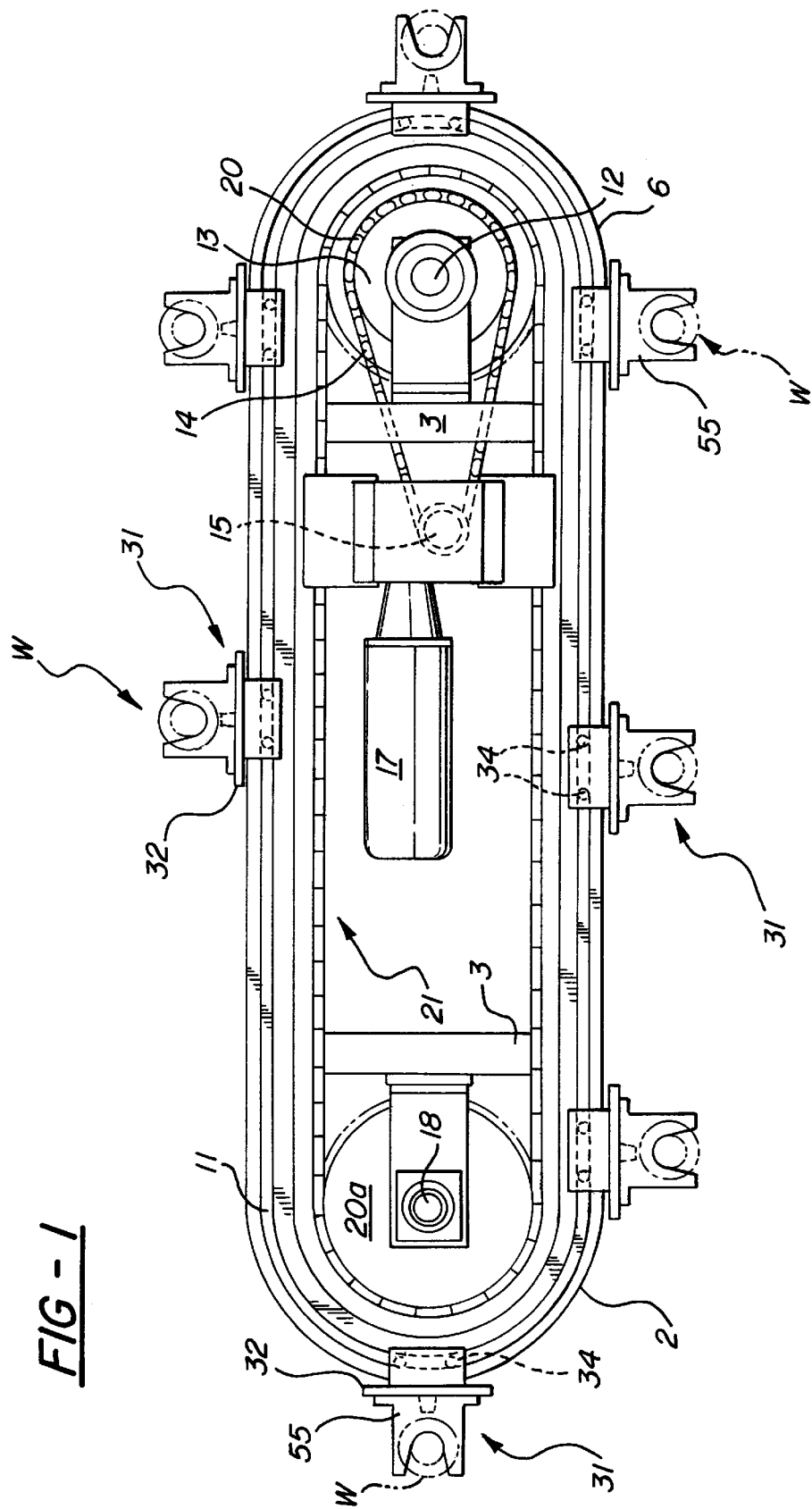
FIG. 1 is a top plan view of the conveyor assembly showing a plurality of workpiece supports and workpieces supported thereby.
Figure 2:
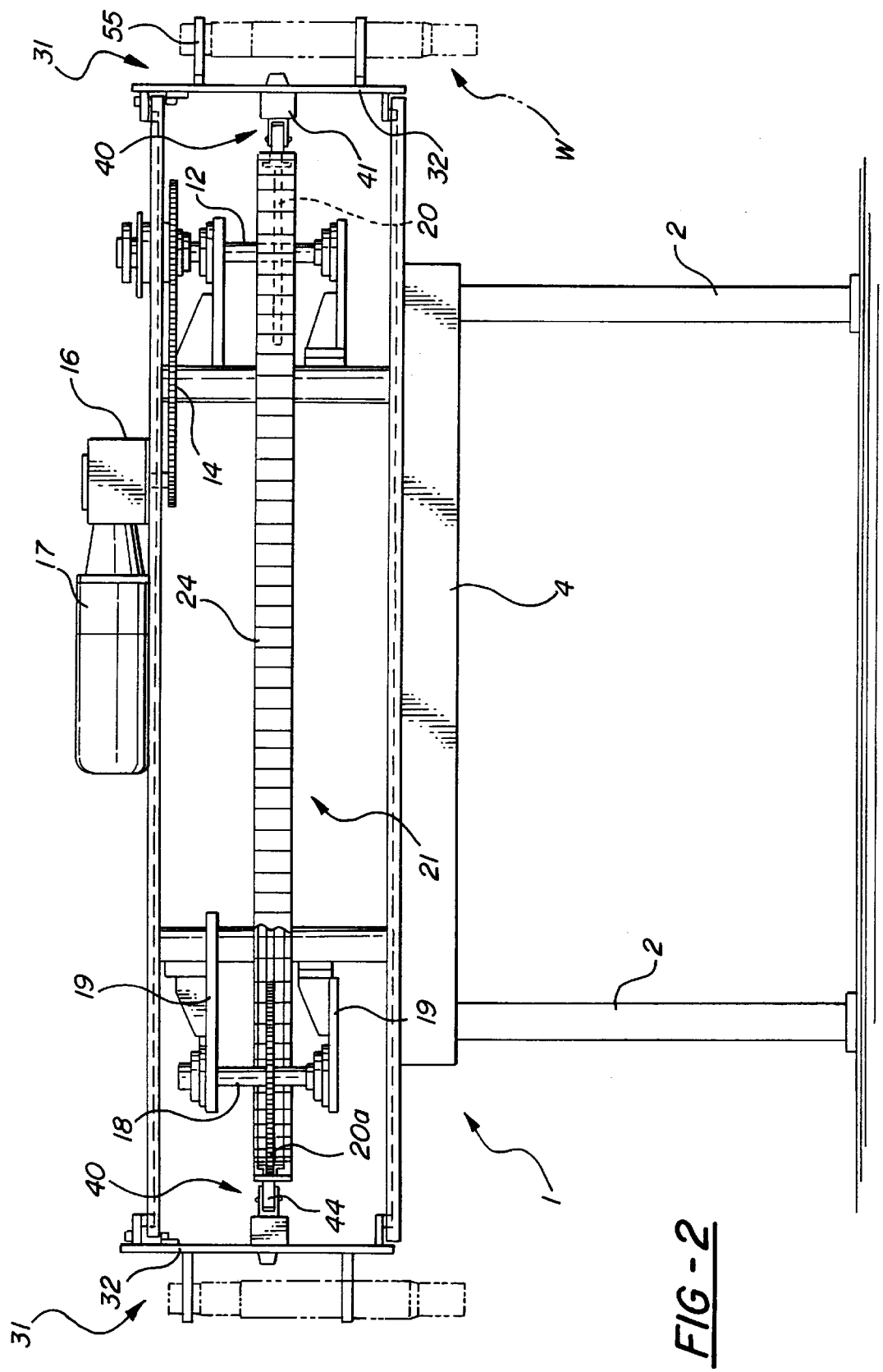
FIG. 2 is a side elevational view with workpiece support arresters omitted for clarity.

A conveyor constructed in accordance with the invention has a main frame 1 having a plurality of upright supporting legs 2 spanned by transverse, horizontal members 3 and longitudinally extending lower and upper parallel frame members 4 and 5, respectively. At corresponding ends of the frame members 4 and 5 are vertically spaced, curved, corresponding sections 6 and 7. The vertically spaced frame members 4, 5 and 6,7 together form a closed loop or path.

Figure 3:
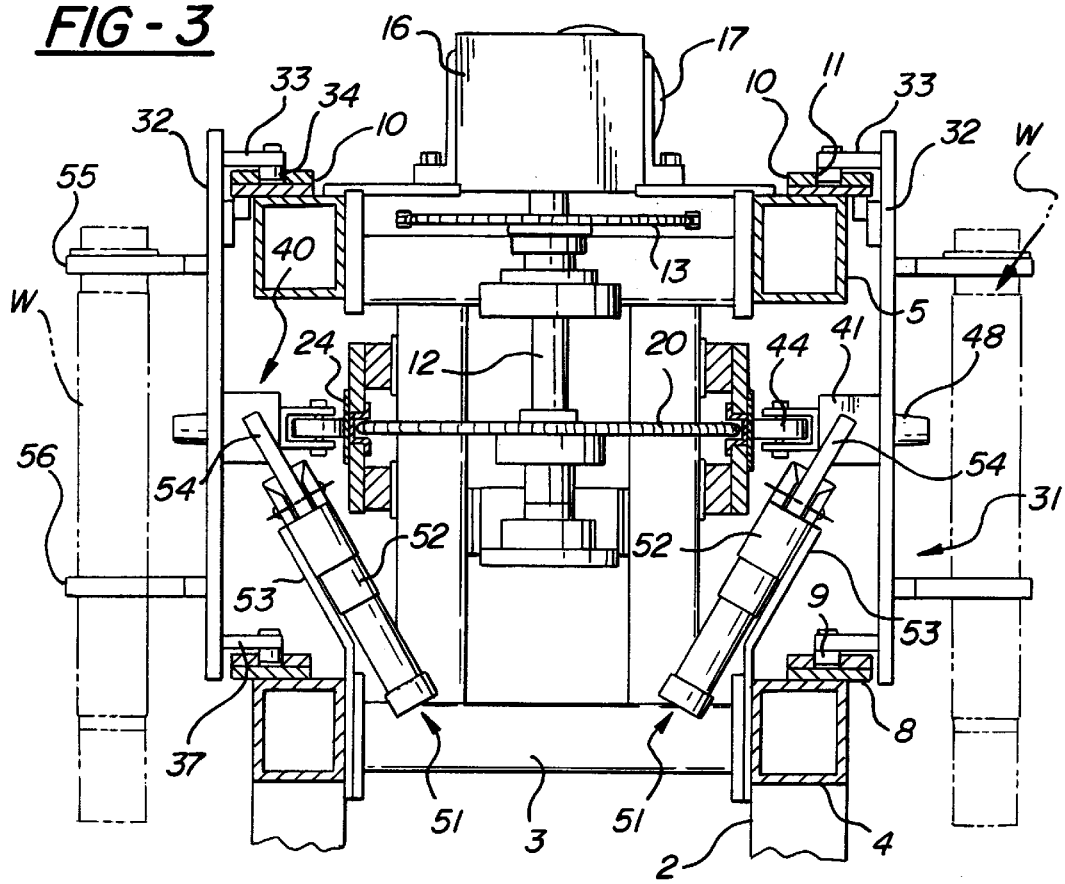
FIG. 3 is a view partly in section and partly in end elevation on an enlarged scale.
Figure 4:
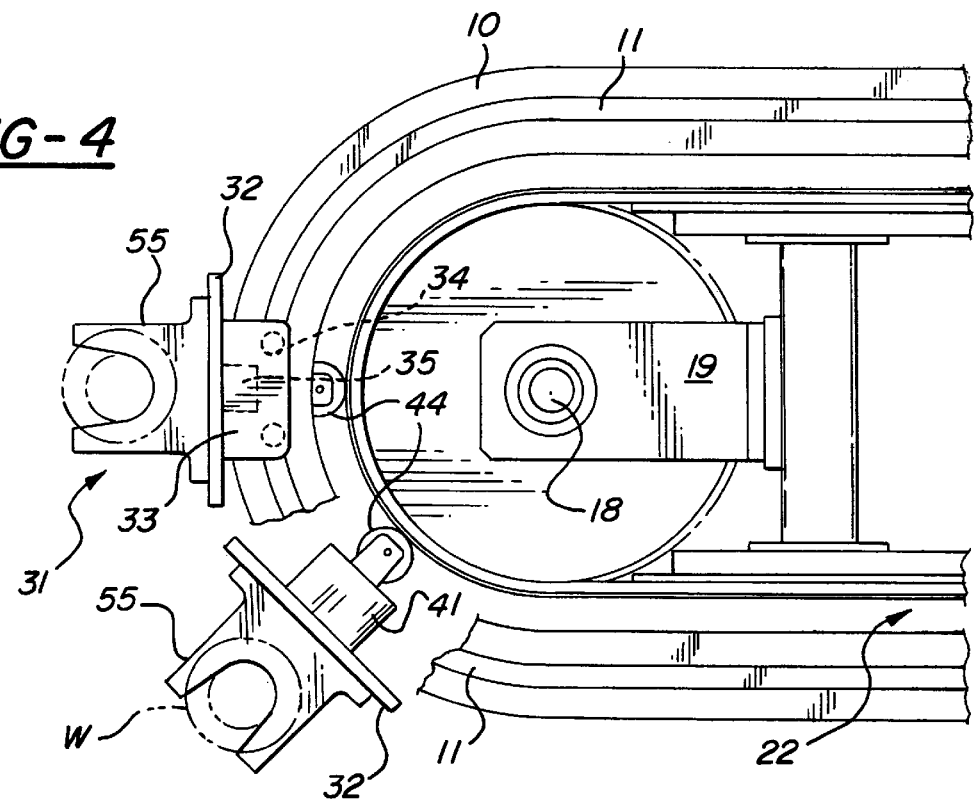
FIG. 4 is a fragmentary, top plan view on an enlarged scale of one end of the conveyor.

As is best shown in FIG. 3, each of the lower frame members 4 supports a lower ledge 8 having an upwardly open, track-forming groove 9. The upper frame members 5 and 7 support a similar ledge 10 having a corresponding, upwardly open track-forming groove 11. The end frame members 6 and 7 have corresponding ledges in which the grooves 9 and 11 continue.

Adjacent one end of the frame 1 is journaled a vertically extending shaft 12. Keyed to the shaft between its ends is a first sprocket wheel 13 around which is trained a driving chain 14. The chain 14 also is trained around a driving pinion 15 which is journaled in the main frame and coupled to a gear box 16 within which is a set of driving gears driven by an electric motor 17.

Adjacent the opposite end of the frame 1 is journaled a vertical shaft 18 by means of supports 19.

Keyed to the shaft 12 at a level below that of the sprocket wheel 13 is a second sprocket wheel 20. Adjacent the opposite end of the frame 1 and fixed on the shaft 18 at the level of the wheel 20 and corresponding thereto is a sprocket wheel 20a.

Figure 5:
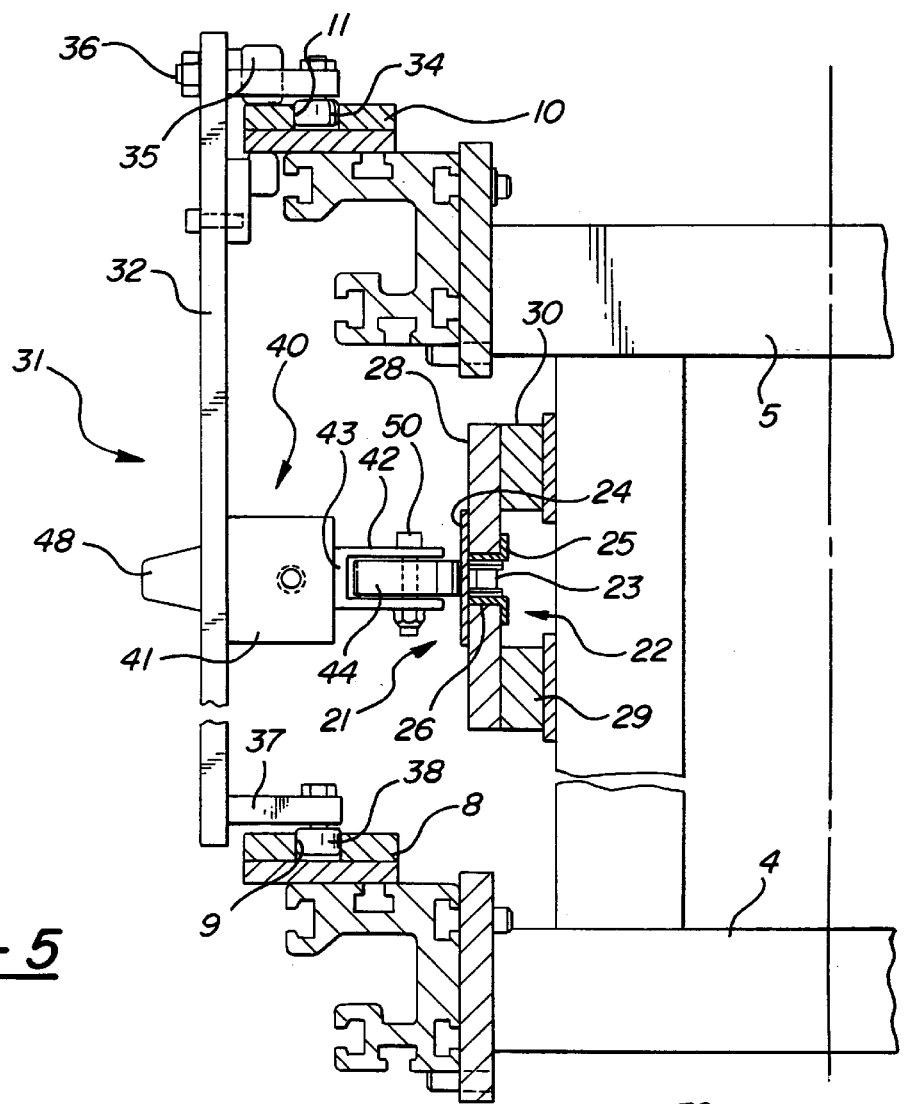
FIG. 5 is a sectional view taken on the line 5—5 of FIG. 2.

Trained around the sprocket wheels 20 and 20a is an endless conveyor member 21 comprising an endless chain 22 having links 23 secured to flat plates 24 which lie in a vertical plane, as is best shown in FIG. 5. The links 23 are pinned to slides 25 to which the plates 24 are fixed, and the slides 25 are accommodated in a slot 26 formed between two vertically spaced guide members 27 and 28 which are supported on frame bars 29 and 30, respectively. The conveyor member defines a closed path having an inner side formed by the chain 22 and an outer side formed by the plates 24.

Removably supported on the frame 1 is a plurality of workpiece supports or pallets 31 each of which is independent of the others and each of which corresponds to the others. Each support comprises a vertically extending plate 32 having at its upper end a horizontal flange 33 which overlies the frame section 7 and mounts a pair of spaced rollers 34 which are accommodated in the groove 11.

Overlying and bearing upon the upper, smooth surface of the ledge 10 is a roller 35 which is journaled on an axle 36 secured to the upper end of the workpiece support 31.

Adjacent the lower end of each of the workpiece support plates 32 is secured an arm 37 on which is journaled a roller 38 that is accommodated in the groove 9 of the associated ledge 8. The arrangement is such that the roller 35 suspends each workpiece support 31 vertically from the upper frame section 7 and the rollers 34 and 38 in the track-forming grooves 9 and 11 guide the workpiece support along an endless path which parallels that of the conveyor member.

Each of the workpiece supports 31 is movable independently of each of the other supports and is equipped with non positive drive coupling means 40 operable to enable and disable conjoint or relative movement of the workpiece support and the conveyor. Each workpiece support is fitted with its own coupling means 40, each of which comprises a housing 41 within which is a slideable carrier or clevis 42 having a pair of legs spaced by a cross bar 43 between which is journaled a roller 44 by journaling means 50. Extending through the housing from the clevis is a threaded shaft 45, that portion of which that is within the housing is encircled by a biasing spring 46 which reacts between the housing and the crossbar 43 of the clevis so as constantly, but yieldably, to bias the roller 44 toward and into engagement with the confronting surface of the conveyor plates 24. The force with which the spring 46 biases the roller 44 toward the conveyor may be limited by an adjustable nut 47 on the shaft 45, and such nut and the outer end of the shaft preferably are enclosed within a cap 48 which, although removable, minimizes the likelihood of unauthorized adjustment of the spring force that the roller exerts on the conveyor. Such spring force should be sufficient to ensure conjoint movement of the workpiece support with the conveyor, but should not be so great as to inhibit rotation of the roller during those periods of time when the support 31 is stationary and the conveyor continues to move. If greater control over the resistance to rotation of the roller 44 is desired, cone shaped clutch parts 49 of known construction may be provided on opposite sides of the roller for adjustment by the roller journaling means 50.

As has been indicated above, it is preferred that the endless conveyor member move continuously and that the workpiece supports 31 selectively be movable with and relative to the conveyor. Since each workpiece support includes its own drive coupling 40 which at all times is coupled via the roller 44 to the conveyor member, it is necessary to provide means designated generally by the reference character 51 for arresting movement of a workpiece support when desired.

Each workpiece arresting means comprises a pneumatic or hydraulic cylinder 52 mounted on a bracket 53 that is supported by the frame member 4, and each cylinder includes a finger 54 which, in response to operation of the cylinder 52 in a conventional manner, may be projected into and out of the path of movement of each workpiece support 31 or a workpiece supported thereon. In the disclosed embodiment the finger 54 is movable into and out of the path of movement of the housing 41 of each coupling 40 as is best shown in FIG. 3.

Figure 6:
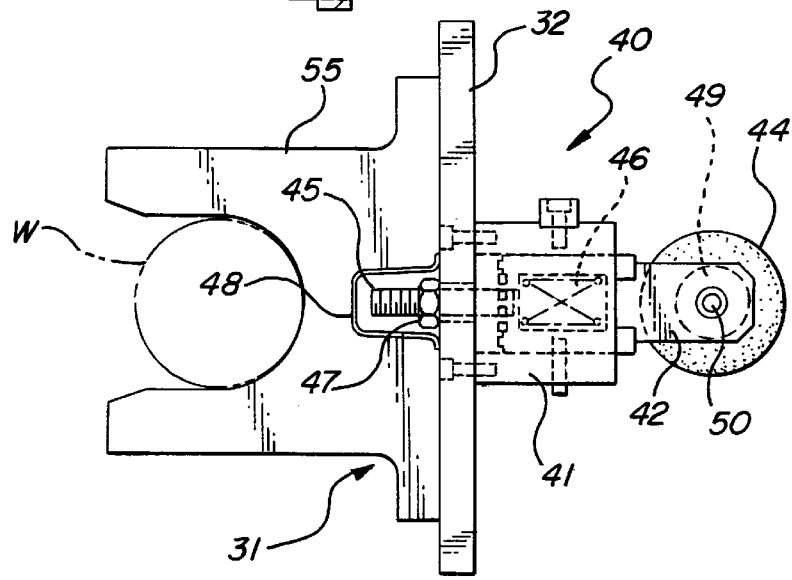
FIG. 6 is a top plan view, on an enlarged scale, of a workpiece support and the coupling by means of which the support is coupled to the conveyor member.

In the disclosed embodiment the vertical plate 32 of each workpiece support 31 is provided with fixturing adapted to support a particular workpiece W. In the disclosed embodiment, and as is best shown in FIGS. 3 and 6, the workpiece W comprises a tube and the fixturing comprises an upper support 55 and a lower support 56 which accommodate and support the workpiece W. The fixturing can be changed to accomodate different workpieces, and the height at which each workpiece is supported on its associated plate 32 may be adjusted via vertically spaced bolt holes, for example, to support the workpiece at an ergonomically appropriate height.

Each workpiece support 31 is guided throughout its movement by the follower rollers 34 and 38 which are accommodated in the track-forming grooves 11 and 9, respectively. Each workpiece support also is suspended in a substantially vertical position by its roller 35.

Since the drive coupling means 40 of each workpiece support 31 bears forcibly against the surface 24 of the conveyor member, and since the conveyor surface 24 bears against the guides 27 and 28, each support member 31 has a tendency to be pushed in a direction transversely far away from the path of movement of the conveyor. This, however, is overcome by the accommodation of the follower rollers 34, 38 in their associated grooves. Accordingly, each workpiece support maintains its vertical orientation and the force with which each drive coupling 40 bears against the conveyor will remain uniform after having been set.

In the operation of the apparatus, workpieces W may be fitted to or removed from the workpiece supports 31 at either end of the assembly (or any other desired position along the endless path defined by the conveyor) either manually or by means of robots. At any selected position along the endless path arresting means 51 may be located so as to interrupt movement of any selected workpiece support along the conveyor path. When the movement of any workpiece support is arrested, those workpiece supports upstream of the arrested support may continue their movement until they abut the arrested support, and accumulate, or until their movement is interrupted by an arresting device. In either case, disengagement of the finger of an arresting device from the arrested support will enable the latter, and any accumulated supports whose movement was arrested by engagement with the arrested support, to move with the conveyor and at the same speed as the latter.

One of the principal advantages of apparatus constructed in accordance with the invention is the positioning of all of the workpieces at the outside of the path defined by the conveyor, thereby enabling access to any workpiece without having to reach over, under, or through the supporting frame. This makes possible the location of workpiece treating means at virtually any position along the length of the conveyor.

Another significant advantage of the disclosed embodiment is its ability to enable virtually any part of the apparatus to be reached for maintenance without having to dismantle any part of the apparatus.

A further significant characteristic of the apparatus is the ability of the conveyor and workpiece support assembly to assume a variety of configurations. For example, the conveyor path and the parallel workpiece support path may be elliptical, substantially rectangular, triangular, or circular. The apparatus accordingly is able to be accommodated in shop areas of greatly differing size and configuration.

Another advantage of the construction is that the position of a workpiece and its support never changes, thereby enabling a workpiece to traverse as much of the conveyor path as is desired in marked contrast to those conveyors wherein a workpiece support may be required to undergo a transition from upright to upside down.

The disclosed embodiment is representative of a presently preferred form of the invention, but is intended to be illustrative rather than definitive thereof. The invention is defined in the claims.

We claim:

1. An accumulating conveyor construction comprising a main frame; an endless conveyor member; means mounting said conveyor member on said main frame for movement along an endless path in a substantially horizontal plane; drive means for driving said conveyor member continuously along said path; at least one workpiece support having a workpiece mounting surface; means mounting said at least one workpiece support on said mounting surface laterally of said path in a substantially vertical position confronting said conveyor member and for movement along said path; cooperable guide means carried by said main frame and said at least one workpiece support for precluding movement of said at least one workpiece support transversely of said path, thereby maintaining said mounting surface in a vertical position; coupling means coupling said at least one workpiece support to said conveyor member for movement conjointly with and relative to said conveyor member; and arresting means mounted on said main frame for movements into and out of said path for respectively disabling and enabling movement of said at least one workpiece support with said conveyor member.

2. The construction according to claim 1 including a plurality of said workpiece supports and a corresponding plurality of said coupling means, each of said supports having one of said coupling means.

3. The construction according to claim 1 wherein said path forms a closed loop having an inner and an outer side, said at least one workpiece support being at the outer side of said loop.

4. The construction according to claim 1 wherein said guide means includes track means carried by said main frame and follower means carried by said at least one workpiece support and movably accommodated in said track means.

5. The construction according to claim 4 wherein said track means comprises vertically spaced grooves and wherein said follower means comprises correspondingly spaced rollers accommodated in said grooves.

6. The construction according to claim 1 wherein said coupling means extends between said at least one workpiece support and said conveyor member and forcibly but yieldably bears upon said conveyor member.

7. The construction according to claim 6 including force adjusting means reacting between said at least one workpiece support and said coupling means for varying the force with which said coupling means bears upon said conveyor member.

8. The construction according to claim 6 wherein said coupling means comprises a roller engaging said conveyor member, a carrier mounting said roller on said at least one workpiece support for rotation, and spring means biasing said roller toward said conveyor member.

9. The construction according to claim 8 including adjusting means for varying the bias exerted on said roller by said spring means.

10. The construction according to claim 6 wherein said coupling means comprises a roller engaging said conveyor member, a carrier mounting said roller on said at least one workpiece support for rotation, and adjustable clutch means reacting between said carrier and said roller for varying the latter's resistance to rotation.

11. The construction according to claim 1 wherein said at least one workpiece support has vertically spaced upper and lower ends and wherein said coupling means is carried by said at least one workpiece support between the upper and lower ends thereof and projects toward and bears against said conveyor member, said guide means comprising vertically spaced tracks carried by said main frame and correspondingly vertically spaced followers carried by said at least one workpiece support and accommodated in said tracks, said tracks and said followers cooperating to maintain said mounting surface in said vertical position and at a substantially constant distance from said conveyor member throughout said path.

12. An accumulating conveyor construction comprising a main frame; an endless conveyor member; means mounting said conveyor member on said main frame for movement in a substantially horizontal plane along an endless path having an inner and an outer side; drive means for driving said conveyor member continuously along said path; at least one workpiece support; means suspending said at least one workpiece support from said main frame in a substantially vertical position confronting said conveyor member for movement with and relative to said conveyor member but spaced therefrom and at the outer side of said path; guide means carried by said main frame and said at least one workpiece support for disabling movement of said at least one workpiece support transversely of said path, thereby maintaining said at least one workpiece support in said vertical position; coupling means coupling said at least one workpiece support to said conveyor member for movements with and relative thereto; and arresting means mounted on said main frame for movements into and out of said path for respectively disabling and enabling movement of said at least one workpiece support with said conveyor member.

13. The construction according to claim 12 wherein the suspending means for said at least one workpiece support comprises a ledge carried by said main frame at a level above that of said conveyor member and projecting laterally of said path to the outer side thereof, and a follower carried by said support, said follower overhanging said ledge and suspending said at least one workpiece support therefrom.

14. The construction according to claim 13 wherein said ledge has an endless groove therein paralleling said path, said follower being movably accommodated in said groove.

15. The construction according to claim 13 wherein said suspending means includes a second ledge carried by said main frame at a level lower than that of said conveyor, said second ledge having an endless groove therein paralleling said path, said at least one workpiece support having a second follower accommodated in the groove of said second ledge, said ledges and said followers together maintaining said at least one workpiece support at a substantially constant spacing from said conveyor.

16. The construction according to claim 15 wherein said coupling means is carried by said at least one workpiece support at a level corresponding substantially to that of said conveyor member and wherein said coupling means bears forcibly but yieldably upon said conveyor member.

17. The construction according to claim 12 including a plurality of said workpiece supports each of which is independently movable along said path.

18. The construction according to claim 17 including a plurality of said arresting means carried by said frame at spaced apart intervals, each of said arresting means being movable into and out of said path for respectively disabling and enabling movement of any one of said supports conjointly with said conveyor member.

19. An accumulating conveyor construction comprising a frame; an endless conveyor member; means mounting said conveyor member on said frame for movement along an endless path in a substantially horizontal plane; drive means for driving said conveyor member continuously along said path; a plurality of workpiece supports; means suspending each of said supports from said frame for movement along said path and in a position confronting said conveyor member, each of said supports having a substantially vertical workpiece mounting surface spaced to one side of said path and on which a workpiece may be mounted at an ergonomically appropriate level; coupling means carried by each of said supports and in constant engagement with said conveyor member; vertically spaced guides carried by said frame and each of said supports for guiding said supports along said path and disabling movements of each of said supports laterally of said path, thereby maintaining said surface of each of said supports in said vertical position; and arresting means mounted on said frame for movements into and out of said path for respectively arresting and permitting movement of any selected one of said supports with said conveyor member, the arresting of movement of any of said supports enabling the supports upstream of the arrested support to accumulate immediately upstream of the arrested support.

* * * * *

UNITED STATES PATENT AND TRADEMARK OFFICE
CERTIFICATE OF CORRECTION

PATENT NO.  : 6,019,214
DATED       : February 1, 2000
INVENTOR(S) : John R. Herronen et al It is certified that error appears in the above-identified patent and that said Letters Patent is hereby corrected as shown below:

Column 4, line 59, should read -- of or -- instead of "far".

Signed and Sealed this

Sixth Day of February, 2001

Attest:

Q. TODD DICKINSON

Attesting Officer

Director of Patents and Trademarks